US008461967B2

(12) United States Patent
Partanen et al.

(10) Patent No.: US 8,461,967 B2
(45) Date of Patent: Jun. 11, 2013

(54) DEVICE AND METHOD FOR ANALYSING RADIO-FREQUENCY SYSTEMS (75) Inventors: Juho Partanen, Espoo (FI); Jukka Voutilainen, Helsinki (FI)

(73) Assignee: Voyantic Oy, Espoo (FI)

(*) Notice: Subject to any disclaimer, the term of this patent is extended or adjusted under 35 U.S.C. 154(b) by 1186 days.

(21) Appl. No.: 12/223,318

(22) PCT Filed: Jan. 30, 2007

(86) PCT No.: PCT/FI2007/050050
§ 371 (c)(1),
(2), (4) Date: Nov. 14, 2008

(87) PCT Pub. No.: WO2007/085705
PCT Pub. Date: Aug. 2, 2007

(65) Prior Publication Data
US 2010/0176927 A1 Jul. 15, 2010

(30) Foreign Application Priority Data
Jan. 30, 2006 (FI) .................................. 20060088

(51) Int. Cl.
*H04Q 5/22* (2006.01)
(52) U.S. Cl.
USPC ................... 340/10.41; 340/10.1; 340/13.26
(58) Field of Classification Search
USPC .................. 340/10.1, 10.4, 572.1, 13.26
See application file for complete search history.

(56) References Cited

U.S. PATENT DOCUMENTS

| 3,949,393 | A | * | 4/1976 | Bjornsen et al. | 341/120 |
| 5,051,741 | A | * | 9/1991 | Wesby | 340/8.1 |
| 5,455,575 | A | * | 10/1995 | Schuermann | 342/42 |
| 5,500,651 | A | * | 3/1996 | Schuermann | 342/42 |
| 5,955,950 | A | * | 9/1999 | Gallagher et al. | 340/572.1 |
| 6,104,291 | A | | 8/2000 | Beauvillier et al. | |
| 6,346,881 | B1 | * | 2/2002 | Davidson | 340/514 |
| 6,414,626 | B1 | * | 7/2002 | Greef et al. | 342/127 |
| 6,433,671 | B1 | * | 8/2002 | Nysen | 340/10.41 |
| 6,496,112 | B1 | * | 12/2002 | Vega | 340/572.1 |
| 6,542,114 | B1 | * | 4/2003 | Eagleson et al. | 342/357.25 |
| 6,603,391 | B1 | * | 8/2003 | Greeff et al. | 340/10.3 |
| 6,756,880 | B2 | * | 6/2004 | Hartmann | 340/10.42 |
| 6,765,484 | B2 | * | 7/2004 | Eagleson et al. | 340/505 |
| 7,176,797 | B2 | * | 2/2007 | Zai et al. | 340/572.1 |
| 7,378,967 | B2 | * | 5/2008 | Sullivan et al. | 340/572.2 |
| 7,511,604 | B2 | * | 3/2009 | Raphaeli et al. | 340/10.2 |

(Continued)

FOREIGN PATENT DOCUMENTS

| CN | 1542937 A | 11/2004 |
| JP | 2003-044789 A | 2/2003 |
| WO | WO-00/28339 A | 5/2000 |

*Primary Examiner* — Jennifer Mehmood
*Assistant Examiner* — Rufus Point
(74) *Attorney, Agent, or Firm* — Birch, Stewart, Kolasch & Birch, LLP (57) ABSTRACT The invention relates to a device for analysing radio-frequency systems. Such a device comprises means for detecting radio-frequency electromagnetic signals, and means for determining at least one analog property of the radio-frequency signal received form the reader. According to the invention, the device further comprises means for producing an electromagnetic excitation signal in order to excite the radio-frequency tag, and means for determining at least one analog property of the return signal received from the radio-frequency tag. The device permits the effective analysis of RFID systems, for example, in system-installation and error-searching situations.

15 Claims, 4 Drawing Sheets

U.S. PATENT DOCUMENTS

| | | | |
|---|---|---|---|
| 7,570,150 B2 * | 8/2009 | Cargonja et al. | 340/10.33 |
| 7,705,711 B2 * | 4/2010 | Takeuchi | 340/10.1 |
| 7,768,392 B1 * | 8/2010 | Brand et al. | 340/539.13 |
| 7,893,834 B2 * | 2/2011 | Park et al. | 340/572.1 |
| 7,969,282 B2 * | 6/2011 | Powell et al. | 340/10.2 |
| 7,973,643 B2 * | 7/2011 | Hyde et al. | 340/10.1 |
| 7,982,601 B2 * | 7/2011 | Corrado et al. | 340/539.22 |
| 8,072,314 B1 * | 12/2011 | Kuzma et al. | 340/10.4 |
| 2005/0237953 A1 * | 10/2005 | Carrender et al. | 370/278 |
| 2006/0000907 A1 | 1/2006 | Forster | |
| 2006/0022800 A1 * | 2/2006 | Krishna et al. | 340/10.2 |
| 2006/0087406 A1 | 4/2006 | Willins et al. | |
| 2007/0069859 A1 * | 3/2007 | Bae et al. | 340/10.1 |
| 2007/0139162 A1 * | 6/2007 | Bandy et al. | 340/10.2 |
| 2008/0252426 A1 * | 10/2008 | Lee et al. | 340/10.3 |
| 2009/0290906 A1 * | 11/2009 | Cowburn | 399/111 |
| 2010/0066506 A1 * | 3/2010 | Schaefer et al. | 340/10.3 |

\* cited by examiner

DEVICE AND METHOD FOR ANALYSING RADIO-FREQUENCY SYSTEMS

The present invention relates to systems, in which an electromagnetic field is exploited in communications between a reading device (reader) and an identifier (tag). Typical such systems are, for example, radio-frequency identification systems (RFID systems), which comprise radio-frequency tags and a reader for reading their information content wirelessly. In particular, the invention relates to a device, which can be used in the design and analysis of RFID systems. Such a device is able to measure the excitation field induced in the reader, for example, in order to detect shadow zones of the field. In addition, the invention relates to a method for analysing reader-tag systems.

RFID systems are rapidly becoming common, for example, in logistics-sector applications and in access-control systems. Typical applications are, for example, warehouse management, transport control, and control of personnel movements. The operating environments can vary widely. RFID systems can be used, for example, in ports, where large containers are moved outdoors, but also indoors, for instance in warehouses or shops, for example, to monitor the movements of pallets, or even individual products. It must thus be possible to design each tag system separately so that it will work reliably in the operating environment in question. Allowance must therefore be made for, for example, the greatest possible distances, the surfaces or electrical properties of the products, to which the tags are attached, and materials in the environment that may attenuate or distort the field. In addition, a choice must be made as to whether to use active or passive tags. The power of the electromagnetic field produced by the reading devices must also not exceed the maximum values permitted by public authorities.

Figure 1:
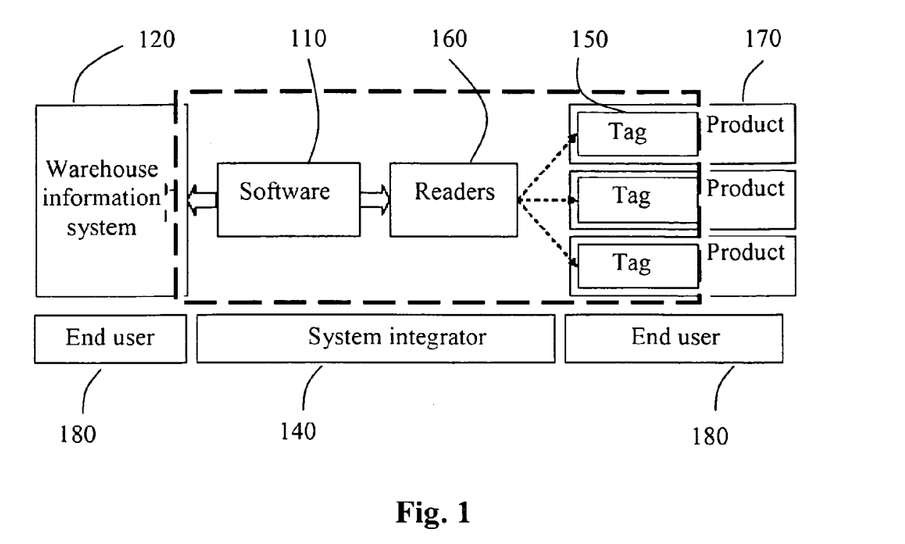
FIG. 1 shows a typical RFID system and the active parts relating to it.

FIG. 1 illustrates a typical RFID system. It comprises a warehouse information system 120, which is utilized by an end user 180, who can be, for example, a goods buyer or a salesperson. At the other end of the chain are the individual products 170 of the warehouse, in which there are tags 150. The data of the warehouse information system are updated through software 110, by monitoring the tags 150 with a reader or readers 160. The system integrator 140 is responsible for the start-up and maintenance of the system.

The start-up and maintenance of an RFID system are multi-stage processes and demand a great deal of expertise, as the operating environments of different customers and the material to be monitored differ significantly. Systems often demand a great deal of customer-specific tailoring, including aspects such as selecting suitable components and investigating compatibility problems. This typically demands the use of expensive general-purpose measuring devices. Such measuring devices are large in size and their operation takes time and demands much expertise.

One problem field of RFID systems is created by the tags, the operation of which depends on factors such as the kind of base they are attached to. Different products and reading conditions indeed require different kinds of tags. On the other hand, the placing of the tags on products also affects the functioning of the system. The selection of the correct type of tag and form of installation is challenging and demands practice by the personnel. No simple measuring device exists, which can check the suitability of a tag for some base or for some operating environment. The reading devices form a second problem field, as it is impossible to check visually whether they develop the necessary exciters. In fixed readers, there are often separate antennae, in the vicinity of which it would be necessary to investigate the power and shape of the field. Particularly when installing reading devices, the power of the field must be estimate, especially the locations of its minimum points and its operation according to the operating regulations and standards for radio frequencies. In warehouse bookkeeping, errors and system fault states arising from the deficient operation of an RFID system become extremely expensive.

Publication U.S. Pat. No. 6,346,881 discloses a testing device and method for wireless systems. The device is placed near to installed RFID tags, where it can listen to the effect of the exciter induced by a reading device external to the tags. Data are transferred wirelessly from the testing device, on a different frequency to the RFID frequency, to the reading device or computer. Such a device is not suitable for comprehensive system analysis, as it is designed only for measuring the response of the tag. Thus the measurement information it produces is strongly influenced by the local environment of the tag.

On the website http://www.epn-online.com/page/14632/real-time-spectrum-analysis-in-rfid-testing.html a real-time RFID spectrum analyser is described, in which there are means for measuring the RFID frequency, spectrum, power, and power-time dependency, and short modulation bursts. The device can be used to listen to the effect on RFID tags of the excitation field of a reader, so that the measurement information produced by the device is always dependent on the properties of the reader. In addition, such a spectrum analyser has typically a large size, so that if it is taken into the measurement area, it will unavoidably interfere with the actual measurement event. When measuring low-power signals back-scattered from the tags, this may be decisive. If antennae external to the device are used, the excitation field or other fields may induce strong interference in the antenna or its transmission line.

A device, described on the website http://www.bvsystems.com/Products/WLAN/BumbleBee/bamblebee.htm, has been developed for the analysis of radio-frequency fields, such as the fields of wireless network base stations. It includes a built-in receiver, a spectrum analyser, and a display for illustrating the spectrum received. In RFID systems, it can be utilized for analysing readers, but it cannot be used as an aid in obtaining a picture of the operation of the entire system.

Special measuring devices are also available for measuring inductive-connection-based tags. Such devices can be typically used to measure the resonance frequency and quality factor of the tags. For example, on the website http://www-.softronica.org/ShowProductInfo.php?product_id=RFTST1000 there is a description of a tag analyser, which is connected to a computer. The device can be used to measure the frequency response of a tag at several different transmission powers. The device is not suitable for system-level analysis.

Devices for measuring the field strength of RFID readers are also known. In practice, such a device can be created by connecting to an RFID tag a set of LED lights, which indicate the magnitude of the excitation field connected to the device. Such a device can be used, for example, to assist in finding an advantageous location in a product for a tag, but it cannot be used to measure the correct frequency behaviour of the tag at the location in question, or changes in the properties, such as the impedance matching and directional pattern, of the tag, which depend on the surrounding materials.

A known device for the quality monitoring of RFID tags under laboratory or factory conditions is disclosed in, among others, publication U.S. Pat. No. 6,104,291, in which the tags are brought individually or in groups into the vicinity of the reading device, with the aid of which their content is read, thus permitting the detection of faults that arise in the tags during production. Another corresponding device is disclosed in application publication JP 2003/044789, in which an electromagnetically protected reference tag is utilized. The greatest reading distance, defined with the aid of the reference tag, is used to evaluate the quality of a tag during the manufacturing stage of the tags. Publication CN 1542937 in turn discloses a method for transmitting a digital signal to an RFID tag and receiving the return signal from the tag. The method can be exploited in the testing stage of tags. Such devices are not applicable in real tag operating environments, not can they be used to analyse the total operation of implemented or planned systems.

The known measuring devices are very suitable for manufacturers of tags or reading devices. However, they can either only be used in specific sub-areas of system design, or else they are not suitable at all for system design. Generally, all that can be said concerning the available RFID readers is that they can tell only whether a tag operates or not. They cannot be used to obtain a picture of the operation of the system that would assist in correcting possible problems, or in improving the system. The special measuring devices made for the analysis of field strengths, on the other hand, are often excessively complicated to use and heavy to move, relative to the actual requirement. In addition, nearly without exception special measuring devices require the user to have technical training, while even then the measurement results are not always reliable, as a wrong measurement connection can make the measurement data wrong and misleading.

If a comprehensive picture of the operation of a system is desired, it is insufficient to measure only the excitation or only the response of the tags. Thus, to measure both several different devices are required, and the measurement data obtained with the aid of both should be combined separately. However, this approach contains several problems and drawbacks. Firstly, when the device is changed in the measurement area, the measurement environment, and thus also the results change. In addition, devices can be calibrated slightly differently. This will lead unavoidably to errors in further analysis. Secondly, combining results from different measurement devices takes time and increases the risk of human error. Thirdly, measurement made on site is time consuming, leading to considerable labour and device costs for the system designers, while in the worst case the target plant's operation may even have to be interrupted for long periods. This is mainly because the known methods are based in many places on analysis made by trial and error.

The invention is intended to eliminate the defects of the prior art and for this purpose create a new device, which will permit the more efficient design and analysis of reader-tag systems. In particular, the invention is intended to create a device, with the aid of which the reliability of RFID systems can be improved and fault seeking in systems accelerated.

In addition, the invention is intended to create a method for analysing RFID systems, to be implemented using the new device.

The device according to the invention comprises integrated means for producing a first excitation signal and integrated means for receiving at least two separate signals. The first signal to be received consists of the excitation signal (second excitation signal) produced by the reader while the second received signal consists of the return signal obtained from the tag. The means for receiving these signals permit the analysis of the analog properties of the signals.

Preferably, at least the signal strength (for example, the power or field strength), and typically also the frequency distribution and phase of the excitation signal of the device (the second excitation signal) and the return signal obtained from the tag are measured. The return signal of the tag can be the excitation signal of the reader (the second excitation signal), or excited by the excitation signal (the first excitation signal) produced by the present device. The excitation of the tag refers to the fact that its response can be detected by the device. This does not necessarily require the exceeding of the threshold voltage (the 'turning-on' of the tag) required for the tag to perform a command (for example, the reading of information content).

In the method according to the invention, in order to analyse radio-frequency systems a suitable device is used to create a first excitation signal in the vicinity of the radio-frequency tag and the device is then used to measure the analog response of the radio-frequency tag caused by the first excitation signal. Using a reader belonging to the system, it is possible to create a second excitation signal, the analog properties of which are then measured using the said device. After this, the analog properties of the second excitation signal are compared with the analog response of the radio-frequency tag, in order to evaluate the compatibility of the reader and the radio-frequency tag.

Considerable advantages are gained with the aid of the invention. By means of the device according to it, properties central to the operation of both tags and reading devices can be effectively measured in both inductive systems and in those based on a radiating magnetic field. Thus it is suitable for the overall analysis of the radio-frequency implementation of an RFID system. The central properties to be defined from the reader include transmission power and the frequency distribution of the signal. Particularly in a system based on inductive connection a central property of the reader is the field strength at a specific point in the field. In a system based on a radiating electromagnetic field, on the other hand, the central properties of the reader include the polarization of the radiation, the directional pattern of the antenna or antennae, or the power density, at a specific point, of the signal it transmits.

The central properties defined by the tag include its frequency response, the strength of the response, or the lowest field strength at which the tag can perform a command according to the protocol used, i.e. the strength of the signal required to 'turn on' the tag, at a point frequency, or as a function of frequency. Particularly in a system based on inductive connection, the central properties include the resonance frequency and quality factor of the tag. Particularly in a system based on a radiating electromagnetic field, the central properties include impedance matching, the directional pattern, and the radar cross-sectional area.

From the analog properties of the signals detected by the device it is then possible to determine the electrical properties of the tag and reader, on the basis of which a system analysis can be made.

The device is able to independently create an excitation field for detecting an tag, so that it is not dependent on an external reading device. On the other hand, the device is also able to measure directly the strength of the excitation field created by an external reading device, without tags located in the target area. The said measurements already in themselves provide important information on the operation of the system, but especially advantageously the device has also means for comparing these measurement data for a deeper system analysis. The term comparing measurement data refers to all such operations, in which the properties of the measured signals are exploited to investigate the joint operation of the tag and reader. These are, for example, the mathematical comparison of the properties of the signals with each other and the graphical or numerical presentation of the properties of the signal on the display of the device for purposes of comparison. The fact that means for processing the signals of the tag and the reader are integrated in a single device and are functionally connected to each other permits a system analysis that is considerably more reliable than previous techniques, and one that is simpler for the user.

Compared to known devices, a significant advantage that is achieved is that the person making the measurement need not change the equipment between measurements concerning the reader and those concerning the tags, unless the measurement conditions change. Particularly, measurements can, if required, be performed at the same physical point and in rapid succession, thus also eliminating the effect of external factors on the measurement. Further, the device can be easily moved to another point in the system.

Functions that exploit the signals measured from tags and readers can also be combined in the device, for example, to derive from the signals some parameter depicting the operation of the system. Such a device application will permit completely new types of analysis method to be implemented, as described above, and as further described later in greater detail in connection with different embodiments.

According to a preferred embodiment, all the components essential to the operation of the analyser, including the antenna, are integrated in the device and preferably located in a single case, so that the device forms an independent unit. Such a device can be carried and operated using one hand. Such a portable device will not necessarily achieve the accuracy of laboratory devices, but it can easily be used to analyse especially variables relating to RFID systems.

One example of the possibilities brought by the device is an embodiment, according to which there are also in the device means for producing a response signal triggered by the excitation signal of a reader, so that the device can be used to emulate a real tag (a so-called dummy tag). In the device, there can also be means for the analysis of modulation and/or digital information from the first and/or second received signals, as well as means for including the modulation and/or digital information in the outgoing excitation and/or response signal.

In the following, various embodiments of the invention are examined in greater detail with reference to the accompanying drawings, in which.

Figure 2:
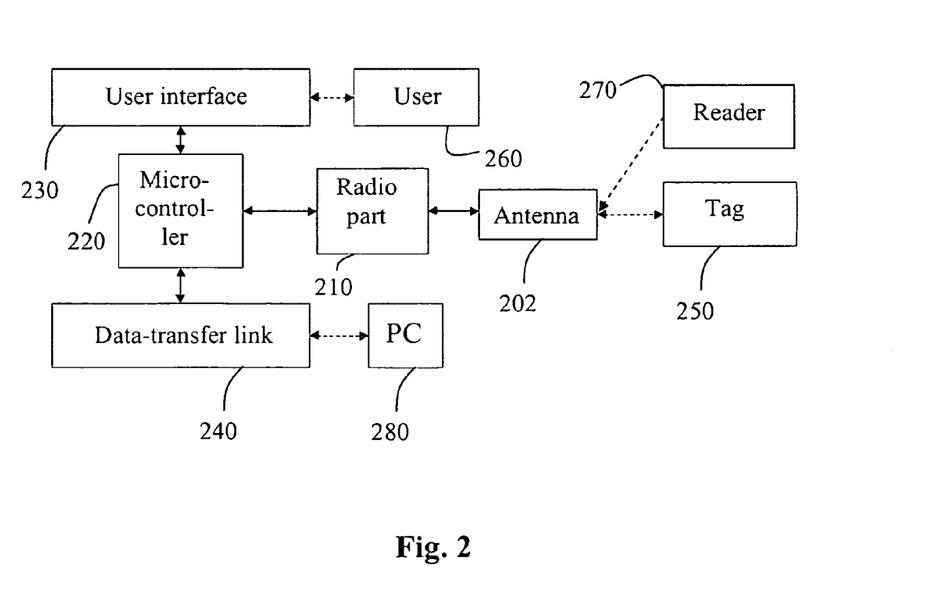
FIG. 2 shows a block diagram of an analyser according to the invention, according to one embodiment.

A block diagram of an analyser according to one embodiment is shown in FIG. 2. The core of the analyser is formed of a micro-controller 220 and a radio unit 210 connected to it. An antenna 202, or at least a connector for an antenna, is connected to the radio unit 210. In addition, the device includes a user interface 230 between the micro-controller 220 and the user 260 and preferably also a data-transfer link 240 to a computer 280.

In principle, the device can be adapted to any frequency range whatever. At present, the most widely used RFID frequencies are 125-134 kHz (LF), 13.35 MHz (HF), 860-960 MHz, at least 868-926 MHz (UHF) and 2.45 GHz (microwave). In the present application, the term signal strength thus refers to the measured field strength or radiation power, depending on the application. The tags being measured can be passive, semi-passive, or active. The embodiments described hereinafter are particularly suitable for analysing systems utilizing passive tags. The device can also be applied to the measurement of the signal produced by all kinds of readers 270.

In this document, the term analog properties of the signal refers primarily to the strength and frequency of the signal, and to its phase at a specific moment in time, or as a function of time over a desired period of time. The term modulation of the signal using properties refers primarily to variables derived from the manner of modulation and the modulation quality, such as the depth of modulation, its non-idealities, times of change, and/or modulation timings. The term digital information contained in the signal refers primarily to the information content, the protocol used, and the quality of the transfer link, for example, the number of error bits.

The radio unit 210 comprises means for creating an excitation signal and for receiving an external excitation signal. Thus, the radio unit 210 can comprise a single transmitter-receiver unit, or a separate transmitter and receiver. In a typical solution, at least one oscillator of the radio unit 210 produces radio-frequency signals for both the transmission electronics and the receiver. In addition, the transmitter and receiver preferably communicate with the antenna through a common bandpass filter. Hereinafter, the term transmitter will refer to that part of the radio unit used to produce an excitation signal while correspondingly the term receiver will refer to that part of the radio unit that participates in the processing of the radio-frequency signal received from the antenna.

The term excitation signal produced by the device refers primarily to the signal connecting to the tag, which, when it is sufficiently strong, induces a measurable return signal from the tag. In some applications (e.g., in a dummy-tag application), the means used to produce an excitation signal can, however, also be used to produce a response signal intended for the reader, as will be described later in greater detail.

In order to achieve a device of small size and to reduce interference or power consumption, it may be preferable for the means for producing the excitation signal to be limited to, or at least to be able to be limited to producing the excitation signal in the vicinity of the frequency band of the radio-frequency system. In order to analyse systems operating on different frequencies it will still be possible to manufacture separate devices.

According to one embodiment, a combination of two or more frequencies is used as the exciter of the tag. The resultant component backscattered on a third frequency is measured from the response signal. This embodiment permits a weak response from tags to be distinguished from a group of other powerful return signals, for example, backscattering from the environment.

The operation of the analyser is controlled by software run in the micro-controller 220, by means of which among other things the operation of the radio unit 210 is controlled when performing measurements.

According to one embodiment, the receiver comprises a equalizer block, in which the strength of the received signal is adjusted to the desired level. Such an equalizer block can comprise, for example, an adjustable attenuator or amplifier, typically both. The equalizer block is intended to modify the signals, the initial levels of which can have differences is strength of several orders of magnitude, to be sufficiently uniform for their further processing. The received signals can also be run through different amplifiers or filters, else in the receiver there can be entirely or partially separate portions for processing the excitation signal of the reader and processing the return signal of the tags. The operation of the equalizer block (the equalization factor, i.e. typically the attenuation ratio of the attenuator and/or the amplification factor of the amplifier) is typically controlled by the micro-controller 220. Thus information of the strength of the original signal can be stored, for example, for defining the absolute value of the excitation field or return signal.

One advantageous way to implement a dummy-tag application is to change the tuning of the antenna of the analyser using data in phase with the subcarrier wave, in exactly the same way as is done generally in passive tags. This technique is particularly advantageously suitable for use in the same device, together with the method to be described later for evaluating the operation of a tag, as both operations require a change in the tuning of the antenna.

In a dummy-tag application, the transmitter can also be limited to a narrow frequency range close to the mean frequency of the radio-frequency system. The analyser will then send data to the reader on the band reserved for return traffic.

The user interface of the device can consist of a graphical display and a keyboard. The measurement results can be shown on the display as quantitative numerical values, or qualitatively in the form of a graph. In the device there is preferably also a connection to a computer, over a data-transfer link, such as an RS-232, USB, or Bluetooth connection.

According to a preferred embodiment, the device includes all the measuring electronics required in all applications, including an antenna or several antennae, software, and a user interface. Typically, the device also comprises an installation place and connector for a battery or other independent power supply.

The radio part is connected to the tags being investigated, through an antenna. The antenna is typically integrated in the device, but external antennae can also be used. In that case the device will have a connector for an antenna. In some applications it is advantageous if the device has several different antennae or correspondingly several antenna connectors, for example, for transmission and reception, or for receiving signals on different levels.

Figure 3:
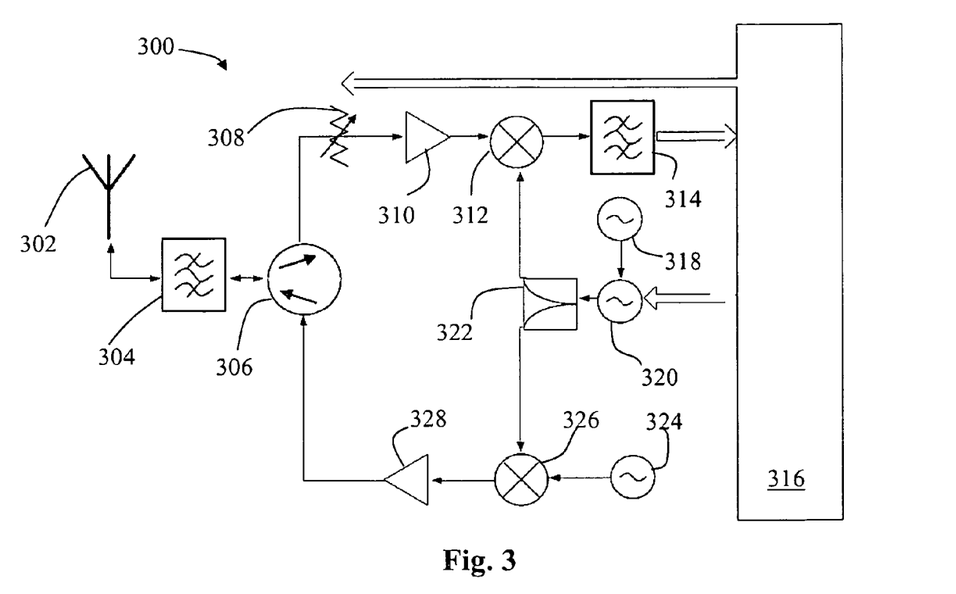
FIG. 3 shows the radio-frequency component of an analyser intended for analog analysis according to the invention, according to one embodiment.

FIG. 3 shows on embodiment of the device in greater detail, particularly its radio part in a system based on a radiating electromagnetic field. At the right-hand side of the figure are control electronics 316, which comprise a controller controlling the operation of the radio part, as well as the D/A and A/D converters required between them. The control electronics preferably controls a voltage-controlled oscillator (VCO) 320 with the aid of a phase-locked loop (PLL). In addition, the frequency synthesizer formed by them includes a reference oscillator 318. A crystal oscillator is preferably used as the reference oscillator 318. The power of the oscillator is divided between the transmission and reception sides by a power divider 322.

The transmission side is illustrated in the lower part of FIG. 3 and the receiving side correspondingly in the upper part. On the transmission side, the carrier wave generated by VCO 320 is mixed with the output of the second oscillator (OSC2) 324 in a mixer 326. The second oscillator 324 operates on the same frequency as the mean frequency of the receiver bandpass filter 314 (in practice, the result is the frequency $f_t = f_{VCO} + f_{OSC2}$). The transmission-frequency signal obtained by mixing is amplified in the amplifier 328 and taken through a transmitter-receiver switch 306 to the antenna 302, in front of which a bandpass filter 304 is connected. On the one hand, the bandpass filter 304 reduces the unwanted signals radiating outwards from the device, on the other hand when receiving it selects only the signals from the desired frequency band. The transmitter-receiver 306 can be a circulator according to the figure, or e.g. a direction switch.

On the receiving side, there is preferably an adjustable attenuator 308 and amplifier 310. In this case, the term adjustable attenuator also refers to a constant attenuator, which can, if desired, be bypassed. The attenuator solution permits the receiver to be used with signals of even very different levels received from both tags and readers. The amplified/attenuated signal is mixed with the signal of the VCO 320 in the mixer 312, so that the signal of the desired frequency (transmission frequency) comes in the centre of the frequency band of the bandpass filter 314. The received signal that has gone through the bandpass filter 314 is A/D converted for use by the control electronics. If readers are not being analysed (spectrum-analyser mode), the transmission-side signal is not taken to the antenna in the manner described above, but the reception frequency scanning can take place in the same manner.

In systems based on inductive connection, the system described above differs particularly in the case of the interface, where the transmitter and receiver are connected to the antenna. According to one embodiment, the transmitter feeds the coil acting as an antenna with a controlled power supply while the voltage induced in the antenna is directed to the receiver.

The analysis of both tags and readers can also be implemented over a broad band range (instead of band scanning), in which case the implementation of the device may differ even greatly from that described above.

The micro-controller and/or the software run in it comprise means for interpreting the spectrum of the signal obtained through the radio unit. Perhaps the most important property to be measured in systems cased on inductive connection is the frequency resonance of the tags. In addition, it is also advantageous to measure from the tags the strength of the connection between the analyser and the tag and the quality of the resonance. In systems based on a radiating electromagnetic field, perhaps the most important property to be measured in the impedance matching of the tag, as a function of the frequency. As described above, the spectrum analysis can be implemented with the aid of an exciter originating from the device, or with the aid of an external exciter. Thus the device is suitable for the analysis of different types of tag and reader.

The spectrum analysis can be implemented, for example, by scanning the measurement frequency of the receiver and the signal obtained by A/D conversion, or by making a Fourier analysis of the broadband response for showing on the display and for analysis. In the analysis, it is possible, if necessary, to use a narrowband signal as the exciter, or a broadband exciter such as a pulse or noise.

The definition of the modulation properties of the received signals can be used as an aid in defining the quality factor of the tags. Particularly in a system based on inductive connection, the quality factor of the tuning circuit of the coil acting as the antenna of either the reader or tag affects the rise and fall times of the modulation of the field created. Thus, among other things, the quality factor of the coil circuit being examined can be indirectly derived from the shape of the modulation. Modulation analysis can also play a central role in evaluating the quality of data traffic or in error seeking.

As stated above, the analyser can also include digital properties. This means that possible coded digital information can be unpacked from the received signals. In the same way, the outgoing signals can be modulated, in order to include digital information in them.

Figure 4:
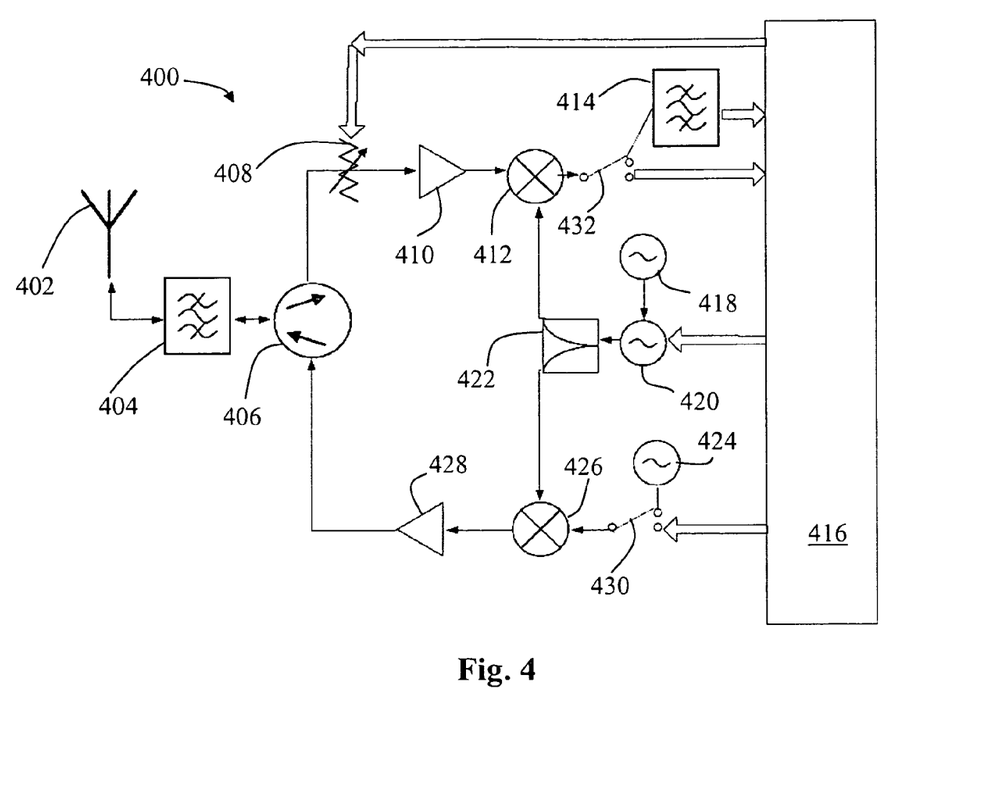
FIG. 4 shows the radio-frequency component of an analyser intended for analog and digital analysis according to the invention, according to one embodiment.

FIG. 4 shows a more highly developed embodiment of the solution of FIG. 3. This embodiment permits digital information to be included in the outgoing signal and digital information to be unpacked from a received signal. In that case, on the transmission side of the device there is a switch 430, to which input can be directed from the device's control electronics 416. Thus, instead of a filter-frequency signal, digital modulation is sent to the transmission mixer 426. In the case of the return signal, a switch 432 is used, with the aid of which the return signal can be routed past a bandpass filter 414 to the control electronics. Further, according to a preferred embodiment, detection of both the I and Q channels is used to unpack digital information. The embodiment of FIG. 4 permits the reading and writing of the tags, listening to traffic between the readers and the tags, as well as digital analyses. For this purpose, the device can be programmed with one or more protocols, which are known in the art.

With the aid of the device described above, it is thus possible to combine in the device the spectrum analysis of the signals being connected, and a logic analysis of the data traffic between the reader and the tag. The logic analysis can be implemented by A/D converting the data-traffic signals at a sufficiently high sampling frequency, for showing on the display and for analysis.

From the tags, it is possible to test digitally, among other things, their operation according to standards, read their content, write to them, and measure the bit-error ratio or some other variable indicating the quality of the connection at different field strengths. The analyser can be used to analyse digitally the operation of reading devices according to standards, in such a way that the analyser acts as a dummy tag. The traffic between the reader and tag too can be examined by listening. With the aid of a logic analysis made on the basis of traffic monitoring, it is further possible to examine the properties of the system in greater detail.

According to one embodiment, the activation threshold of the tag is measured, i.e. the smallest transmission power, which is required to activate the tag in the reader-tag geometry used, is defined. The term activation refers to the fact that the tag will react to a command according to the protocol used. The measurement of the activation threshold can be performed, for example, in such a way that the tag is given a command by the analyser at a specific carrier-wave frequency, using a power at which the tag does not yet respond. The power is gradually increased, giving a command at each power, until the tag responds correctly according to the protocol used. The actual object of the measurement is this threshold power, most usually measured as a function of frequency.

Many other properties too can be implemented within the scope of the inventive idea disclosed above, using by means of changes to the electronics of the radio unit, or even by only updating the software being run in the micro-controller.

All the essential components in terms of the operation of the device, including the antenna or antennae, can be integrated in a single case. Thus the device can be implemented as a very small and light totality, that can even be operated with one hand. The integrated totality is also more tolerant of interference, as for example interference connected through an electric field with not be able to connect to the cables belonging to the measuring system. At least part of the measuring electronics of the reader and tag are preferably common to both these functions. In a preferred embodiment, the entire measurement electronics except for the antenna can be located inside an electrically conductive case. On the other hand, such device permits a more rapid system analysis compared to known devices and even new RFID-system installation and maintenance applications.

Generally speaking, it is possible with the aid of the device to implement analyses, at some stage in which the excitation signal is modified on the basis of the properties of the received signal, or on the basis of the signals received form the reader and correspondingly the tag the compatibility of the reader and tag is evaluated.

Figure 5:
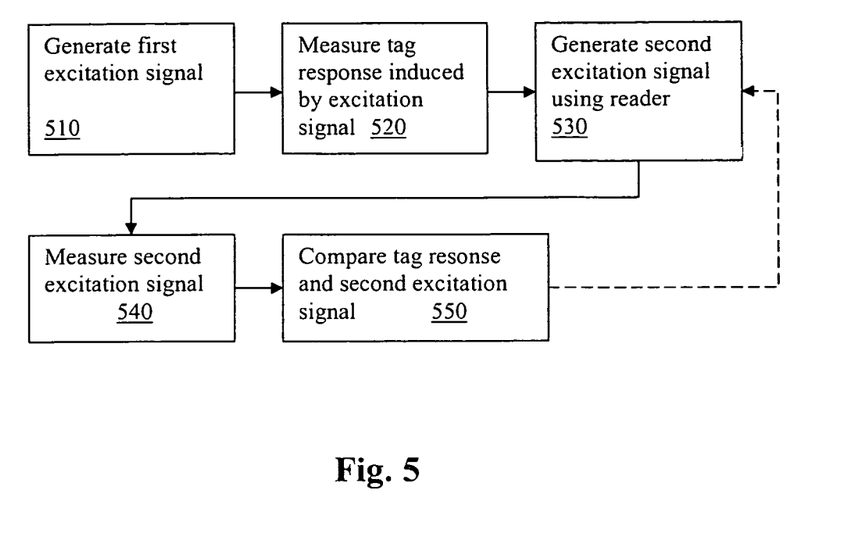
FIG. 5 shows a flow diagram of the stages of a method according to one embodiment of the invention.

FIG. 5 shows a flow diagram of one possible way to perform a system analysis. In stage 510, the analyser is used to create a first excitation signal in the vicinity of a radio-frequency tag. In stage 520, the analog response of the radio-frequency tag caused by the first excitation signal is measured with the analyser. In stages 530 and 540, with the aid of the reading device a second excitation signal is created and its analog properties are measured with the aid of the analyser. Once the necessary information has been measured, the analog properties of the second excitation signal are compared with the analog response of the radio-frequency tag, in order to evaluate the compatibility of the reader and radio-frequency tag (stage 550). The measurement of the reader and the said comparison can be performed separately at several discrete points, or essentially continuously, in which case the excitation field of the reader will be on for the whole time. The comparison is typically performed in the micro-controller, preferably by means of software. If desired, the result of the comparison can be indicated with the aid of sound, or visually, thus further accelerating the investigation of the operation of the type of tag in the field of the reader.

According to a method that can be implemented with the aid of one device, the tag used in the system is first analysed, i.e. its frequency response and the parameters derived from it are determined. With the aid of these, a mathematical model of the tag can be created for the analyser. The model is used in comparison stage 550, when the analyser is used to examine the excitation signal of the reader in the reading area. Thus it is possible, for example, to chart whether there are locations in the measurement area, where a tag of the type in question would not function. It is also possible to take into account mathematically the effects of external parameters, such as the effects of different materials acting as the base of the tag, so that it will really not be necessary to glue tags to the bases in question.

The method described above for evaluating the operation of a tag can be implemented, for example, on the basis of the properties of the antenna of the analyser, or its adaptation to the response of the tag. The method will then comprise the following stages:

1. measure the response of the tag,
2. use the adjustable circuit elements to alter the properties of the antenna, or adapt it to correspond to the properties of the response of the tag,
3. measure, using the adjusted antenna, the excitation signal of the reader at least one point,
4. on the basis of the response of the tag and the excitation signal of the reader, evaluate the compatibility of the tag with the reader at this point.

The properties of the antenna or the matching of the antenna can preferably be adjusted using adjustable active or passive circuit elements, for example, adjustable resistances or capacitors.

Particularly in systems based on inductive connection, the method can be implemented, for example, according to the following more detailed description. One skilled in the art will understand that the same principles can be applied in systems based on a radiating electromagnetic field.

The measurement of the response of the tag, to be carried out in the first stage, preferably comprises the determining of the strength of the response and the resonance frequency and quality factor of the tag. The response is preferably measured at some standard distance. For this purpose, there can be a measurement zone in the analyser case, which is brought into contact with the tag for the duration of the measurement. In addition, it is possible to measure the strength of the excitation signal required to start the tag, by adjusting the transmission power of the analyser. Prior to measuring the response of a tag, the tag can be placed on the base, on which it is desired to investigate its operation.

In the second stage, the correct values are adjusted (typically by using as an aid calculation and/or measurement of the components) for the components of the antenna circuit, such as parallel or series capacitors, in order to adjust the properties of the antenna to correspond to the properties of the tag, such as its resonance frequency and quality factor. In the measurement, it is possible to use the same electronics as in the measurement of the response of the tag, as described above. The strength of the connection of the antenna coils depends on the mutual geometry of the coils. At its simplest, the differences in geometry can be compensated on the basis of the strength of the connection between the analyser and the tag. In order to make define the model of the tag more precisely, the analyser can comprise a possibility to input the geometric parameters of the measured tag to the device. The actual compensation can be implemented either by controlling the receiver amplifier correspondingly, or by taking the difference into account by means of software.

The third and fourth stages can be repeated at several points in the field of the reader, in order to evaluate the operation of the tag in question in the vicinity of the reader (i.e. to see if locations can be found at which the tag does not function).

In the fourth stage, the evaluation can be performed by calculation, on the basis of the properties of the response of the tag and the properties of the measured reader field. The result (that the tag functions at the point in question/the tag does not function at the point in question) is typically communicated to the user visually or audibly. Particularly if the strength of the excitation signal necessary to start the tag has been measured in the first stage, the operation of the tag can be evaluated simply by monitoring whether the set antenna threshold voltage is exceeded, i.e. whether sufficient energy is transmitted from the reader to the tag to activate the tag.

In order to implement the method, there are thus adjustable circuit elements connected in parallel or in series with the antenna, typically an electrically adjustable capacitance (for example, a capacitance diode) and an electrically controlled resistance (for example, a digital potentiometer). With the aid of the capacitance, the antenna is tuned to the same frequency as the tag's measured resonance frequency and the resistance is used to adjust the quality factor of the antenna to be the same as the measured quality factor of the tag.

The evaluation of the operation of a tag in the field of a reader can be implemented by software, for example, as follows:

1. The frequency response of the tag is measured at some constant distance (e.g., in contact with the measurement zone of the analyser, for instance on the bottom of the case). Determine from the frequency response the strength of the response and the resonance frequency and quality factor of the tag. It is also possible to measure the strength of the excitation signal required to start the tag, by adjusting the transmission power.
2. The adjustable circuit elements are adjusted in such a way that the maximal (or otherwise optical in terms of the dynamics of the receiver) signal is transmitted from the reader to the receiver of the analyser. I.e. in practice the reader is tuned to the operating frequency (e.g., 13.56 MHz). The tuning can now also be implemented in such a way that a previously adjusted tuning circuit is connected to the antenna, for example using an electrically controlled switch.
3. Now that the responses of both the tag and the antenna of the analyser are known, the differences of the responses are compensated using the software.
4. The analyser is moved around in the field of the reader and an attempt is made to find locations at which the tag will not function (i.e. the calculated threshold voltage is not exceeded).

The tag's measured frequency response can also be utilized, if the device is used as a dummy tag. In that case, it is possible, for example, to attempt to produce a response signal, triggered by the excitation signal of the reader, which corresponds as closely as possible to the return signal, which a tag of the type in question would cause at that location.

Alternatively, the device can be used to produce an excitation field characteristic of a specific type of reader and investigate the response of the tags to a field of this kind. Thus, differing from the previous embodiment, a mathematical model of the reader or the reader's field can be created in the device. The properties of the reader can first be measured using the device. This embodiment permits, for example, the effective placing of the reading devices, or the antennae they use, without there being any need to really move the readers or their antennae in the design stage. This brings a considerable addition advantage for the system designers.

On the basis of the above description, it will be obvious to one skilled in the art that the device can be applied to the analysis of all systems operating in the manner of RFID systems. Versions of the device that utilize a near field, a remote field (propagating electromagnetic waves), or both can be implemented. Measurements in the near field can be performed using either an electric or a magnetic field. Devices that operate in different ways are suitable for the corresponding measurement and investigation of systems of different types.

The examples of embodiments described above do not restrict the invention, but instead it must be interpreted in an equivalence interpretation taking into account the full extent of the accompanying Claims.

The invention claimed is:

1. A method for analyzing radio-frequency systems including a radio-frequency tag and a reader for reading wirelessly information content of the radio-frequency tag, which method comprises the following steps:
    (a) creating a first excitation signal in the vicinity of the radio-frequency tag,
    (b) measuring the analog response of the radio-frequency tag caused by the first excitation signal, and
    (c) measuring the analog properties produced by a second excitation signal produced by the reader,
    wherein the steps (a), (b), and (c) are performed using a single device and the method comprises an additional step of:
    (d) comparing the analog properties of the second excitation signal with the analog response of the radio-frequency tag, in order to evaluate the compatibility of the reader and the radio-frequency tag.

2. The method according to claim 1, wherein, with the aid of steps (a) and (b), the activation threshold of the radio-frequency tag is measured as a function of frequency.

3. The method according to claim 1, wherein the analog properties of the second excitation signal are measured at several points in the vicinity of the reader and are compared with the analog response of the radio-frequency tag.

4. The method according to claim 2, wherein step (d) too is performed using the device.

5. The method according to claim 4, further comprising:
a step (b2) in which a mathematical model of the tag is created in the device on the basis of the analog response of the radio-frequency tag, and the model is used in step (d) to evaluate the compatibility of the reader and the radio-frequency tag.

6. The method according to claim 4, further comprising:
a step (c2) in which on the basis of the analog properties of the second excitation signal a mathematical model of the reader is created in the device, and the model is used in step (d) in order to evaluate the compatibility of the reader and the radio-frequency tag.

7. The method according to claim 2, further comprising:
determining the desired analog properties of the tag with the aid of steps (a) and (b),
adjusting the properties or matching of the antenna in the device to correspond to the analog properties of the tag,
measuring, in step (c), the adjusted antenna using the strength of the signal induced in the antenna by the field of the reader at least one point, and measuring the strength of the signal obtained through the adjusted antenna, and
determining, in step (d), whether the signal is sufficiently great for the tag to function.

8. The method according to claim 2, wherein said device is a portable device.

9. A device configured to analyze radio-frequency systems including a radio-frequency tag and a reader for reading wirelessly information content of the radio-frequency tag, the device comprising:
a controller configured to
(a) create a first excitation signal in the vicinity of the radio-frequency tag,
(b) measure the analog response of the radio-frequency tag caused by the first excitation signal, and
(c) measure the analog properties produced by a second excitation signal produced by the reader,
(d) compare the analog properties of the second excitation signal with the analog response of the radio-frequency tag, in order to evaluate the compatibility of the reader and the radio-frequency tag.

10. The device according to claim 9, wherein the controller is further configured to measure the activation threshold of the radio-frequency tag as a function of frequency.

11. The device according to claim 9, wherein device is configured to measure the analog properties of the second excitation signal at several points in the vicinity of the reader, and
compare the measured analog properties with the analog response of the radio-frequency tag.

12. The device according to claim 11, wherein the controller is further configured to:
create a mathematical model of the tag based on the analog response of the radio-frequency tag, and
use the mathematical model to evaluate the compatibility of the reader and the radio-frequency tag.

13. The device according to claim 11, wherein the controller is further configured to:
create a mathematical model of the reader based on the analog properties of the second excitation signal, and
use the mathematical model to evaluate the compatibility of the reader and the radio-frequency tag.

14. The device according to claim 10, wherein the controller is further configured to:
determine the desired analog properties of the tag with the aid of steps (a) and (b),
adjust the properties or matching of the antenna in the device to correspond to the analog properties of the tag,
measure the adjusted antenna using the strength of the signal induced in the antenna by the field of the reader at least one point, and measuring the strength of the signal obtained through the adjusted antenna, and
determine whether the signal is sufficiently great for the tag to function.

15. The device according to claim 10, wherein said device is a portable device.

* * * * *